July 16, 1957 — W. R. KERR — 2,799,203
APPARATUS FOR IMAGE DEFINITION
Filed March 26, 1953 — 2 Sheets-Sheet 1

INVENTOR
WILLIAM RAYMOND KERR

ATTORNEY

July 16, 1957     W. R. KERR     2,799,203
APPARATUS FOR IMAGE DEFINITION

Filed March 26, 1953     2 Sheets-Sheet 2

INVENTOR
WILLIAM RAYMOND KERR

ATTORNEY

United States Patent Office 2,799,203
Patented July 16, 1957

2,799,203
APPARATUS FOR IMAGE DEFINITION

William Raymond Kerr, Beaver Falls, Pa., assignor to Armstrong Cork Company, Lancaster, Pa., a corporation of Pennsylvania Application March 26, 1953, Serial No. 344,720

2 Claims. (Cl. 88—14)

This invention relates to apparatus for image definition and is concerned particularly with the problem of evaluating the surface characteristics of a material having a glossy surface such as the finished surface of a decorated wallboard.

Decorated wallboard is customarily prepared by the application of a decorative lacquer or synthetic resinous enamel to the surface of a base such as hard pressed fiberboard. Usually one or more base or prime coats are applied to the fiberboard and are sanded smooth. One or more finish coats generally of lacquer or enamel are applied over the base coat and form the exposed surface of the product. For many uses, particularly in kitchens or bathrooms, it is desirable to have a high gloss surface which will not retain dirt or dust. The "gloss factor" so-called is affected by many elements which are involved in the production of the product. The fiber surface characteristics of the base material, the effectiveness of the sanding of the prime coat or coats, the degree of "delustering," and the tendency of the various finish films to wrinkle all affect the final gloss of the product. Some films flow better and are more stable upon hardening than others, and they produce a better gloss in the finished product. The final coat is, of course, formulated to provide the best possible gloss, but the factors mentioned above all affect that property of the product to a greater or lesser degree.

It is an object of this invention to provide for evaluating the gloss factor of a glossy surface which will take into account all of the factors mentioned above which affect the gloss of the final product.

Another object of the invention is to provide an apparatus by the use of which the gloss factor may be determined with reasonable accuracy and with reproducible results and will take into account the various factors affecting gloss which have been referred to.

Other objects of the invention will become apparent from consideration of an embodiment of the invention which will be described in conjunction with the attached drawings, in which.

Figure 1:
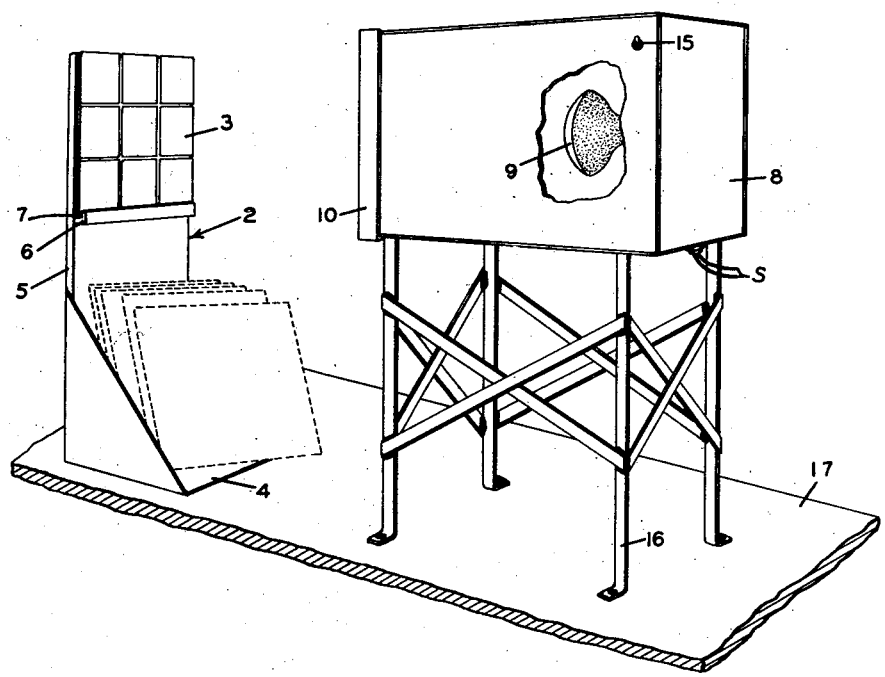
Figure 1 is a perspective view illustrating an apparatus for measuring image definition.

Referring to Figure 1 the device comprises a support 2 for a specimen 3 to be examined. The support includes a horizontal base 4, a vertical member 5, and a strip 6 which has a groove 7 therein for the reception of the edge of the specimen 3, with the specimen disposed in a substantially vertical position lying in engagement with the strip 6 and the vertical member 5.

Figure 2:
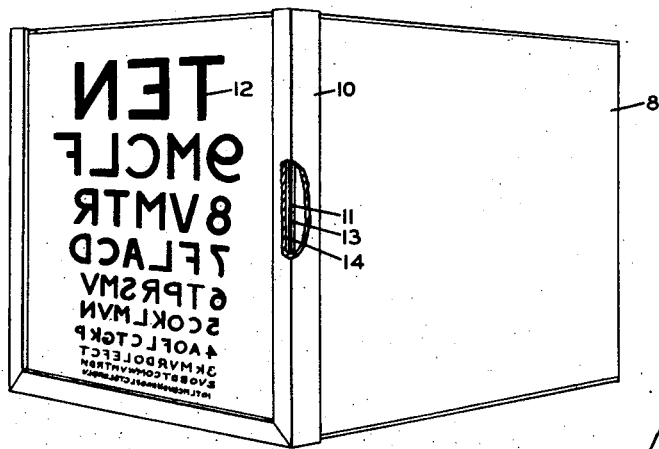
Figure 2 is a perspective view of the housing for the light source and intelligence mask removed from the apparatus of Figure 1.

A housing 8 for the light source 9 is provided. The housing preferably comprises a generally rectangular box 12" x 12" x 18" long which is provided in the front with a frame 10 for the reception of a mask 11 which is interposed between the light source 9 and the specimen 3. The mask 11 is preferably formed of a good quality linen tracing cloth upon which is provided intelligence 12 which in the embodiment illustrated is in the form of letters disposed in ten rows, with the letters diminishing in size from the top row to the bottom row. The letters are preferably applied by hand in India ink and on both sides of the tracing cloth to provide sharp outlines and complete opacity. Mounted behind the mask 11 is a sheet of ⅛" opal glass 13 for good light diffusion, and in front of the mask is a protective sheet 14 of ⅛" clear glass. As noted in Figure 2 the mask is placed backwards in the housing so that when viewed on the specimen the image will appear in normal position. The mask is held in flat condition between the glass plates which are received within a slot in the frame 10 as indicated in Figure 2.

In the embodiment illustrated with a 12" x 12" mask, outside dimensions, the letters were dimensioned as follows, all dimensions given in inches:

| Line No. or Value | Dimensions of Letters (Height and Width) | Width of Line Used in Letters | Spacing Between Letters | Spacing Between Line and Next Larger Line |
|---|---|---|---|---|
| 1 | ⅛ x ⅛ | 0.0325 | 0.125 | 0.1 |
| 2 | ¼ x ¼ | 0.055 | 0.15 | 0.1 |
| 3 | ⅜ x ⅜ | 0.08 | 0.175 | 0.15 |
| 4 | ½ x ½ | 0.10 | 0.20 | 0.20 |
| 5 | ⅝ x ⅝ | 0.125 | 0.225 | 0.22 |
| 6 | ¾ x ¾ | 0.15 | 0.250 | 0.25 |
| 7 | 1.0 x 1.0 | 0.19 | 0.30 | 0.30 |
| 8 | 1¼ x 1¼ | 0.25 | 0.35 | 0.35 |
| 9 | 1½ x 1½ | 0.28 | 0.4 | 0.4 |
| 10 | 2.0 x 2.0 | 0.375 | 0.5 | |

The spacing of the letters both vertically and horizontally, as well as the width of the lines used in forming letters, were determined from a graph so that the increases were proportional.

The light source 9 is preferably a reflector flood type incandescent lamp of 150 watt size—120 volts which serves to diffuse the light quite evenly over the entire mask. The distance from the front edge of the lamp to the rear surface of the opal glass plate 13 is eleven inches, but this distance is not critical. The inside of the housing may be coated with aluminum paint or provided with any light-reflecting coating or layer, but this too is not essential. The critical element is to provide a good source of light well and uniformly diffused over the entire surface of the mask and of sufficient intensity to project well onto the specimen to be examined. A control switch 15 is provided for the light source, and a connection is made from a source of electrical energy S indicated diagrammatically in Figure 1.

The housing 8 is mounted on a framework 16 secured to a table or other mounting surface 17 which also carries the specimen support 2. The housing 8 and the support 2 are positioned so that the mask 11 and the surface of the specimen 3 are disposed in parallel planes and are spaced apart about 24". This distance is established for normal vision. The spacing will vary with different materials to be examined. For instance, with a glass mirror as a specimen the working distance could be 36" between the mask and the surface to be examined; and, with a good mirror, line or value 1 of the mask will be legible on the mirror to anyone with normal vision. However, this distance is too great for material like baked enamel finishes on wallboard, for if set at 36" it would not be possible to obtain an image definition value of less than about 4 or 5 on the best material. Therefore, an arbitrary distance of 24" has been established between the chart and the surface to be examined. This enables the operator to see all of the lines rather well and to evaluate under conditions of reasonably good visibility.

Figure 3:
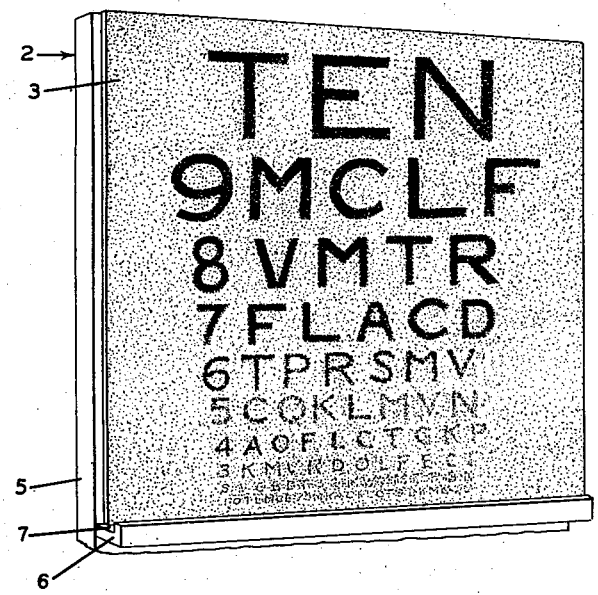
Figure 3 is a perspective view which illustrates a specimen having intelligence projected thereon and indicating diagrammatically a product having good gloss characteristics.

In the operation of the device, the specimen to be examined is positioned in the holder 2 and the switch 15 is turned on, energizing the light source 9; and light is projected onto the surface of the specimen 3 through the mask 11. With a good high gloss surface, free of wrinkles and not substantially delustered, the projected image of the mask will be clearly legible throughout at least lines or values 3 to 10. Such a specimen has been diagrammatically illustrated in Figure 3. The product there may be said to have a value of 4, for line No. 4, is the last line of intelligence which is clearly legible. Such a product would be classed as possessing a good gloss factor. If the value were 2, i. e., if line 2 were clearly legible, the product would classify as having an excellent gloss factor. With commercially available wallboards, a value of 1 is not obtainable at the present time.

For best results in making examinations, the specimens should be disposed so that the surface to be examined is substantially parallel to the plane of the mask. There may be some lateral offsetting of the specimen with respect to the mask which may be necessary to facilitate examination from a position with the head of the operator disposed closely to the side of the housing 8, and this lateral offsetting will not be objectionable so long as the intelligence is projected upon and reflected from the specimen. The operator should view the speciment at about eye level and at an angle of 25° or less with respect to a line drawn at right angles to the flat surface of the specimen. This provides for the best possible numerical evaluation of various specimens; whereas, when viewed from a wider angle there are introduced undesirable factors, and with an extremely wide angle of viewing, a relatively poor gloss finish may appear to have as good image definition as a much better finish. Therefore, viewing should be accomplished at as small an angle as possible in order to obtain criticality in definition by the various specimens. Best results are obtained in the absence of overhead lights or the glare from uncurtained windows and, therefore, the instrument should be installed where it can be operated in a darkened room or where a curtain shield may be drawn around the unit to avoid the effects of overhead lighting or window glare.

While there is some perceptible difference in the examination of specimens of different colors because of their different light-reflecting properties, the differences in image definition due solely to color are not of major significance.

Figure 4:
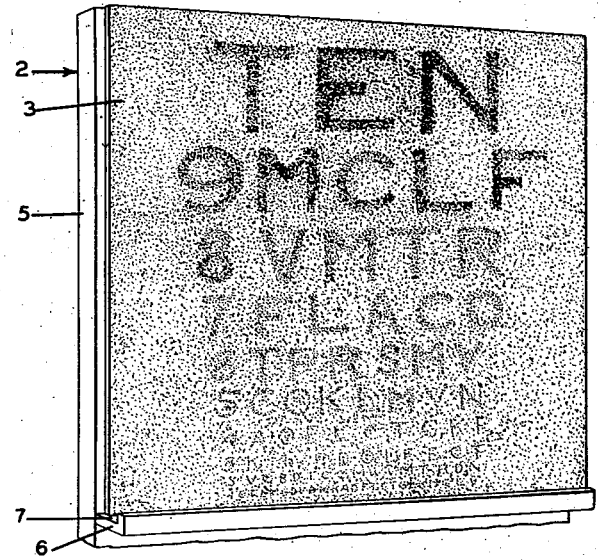
Figure 4 is a view similar to Figure 3 showing a different specimen having the same intelligence projected thereon as the specimen of Figure 3, this specimen having poorer gloss quality than the specimen of Figure 3.

In adition to determining the numerical value of image definition, it is possible with the apparatus where the projected light is diffused through opal glass and linen tracing cloth with opaque letters to obtain a visual enlargement so to speak of imperfections in the surface of the material, such as wrinkles or wavy surfaces, particularly in the areas outlying the letters, for with a wrinkled or wavy surface the outlines of letters also will appear wavy. No attempt has been made to illustrate this in Figures 3 and 4. The specimens there shown are substantially plane surfaced and free of waves or wrinkles but with the specimen of Figure 3 having a much higher gloss factor than the specimen of Figure 4. In Figure 1, a specimen having a tile pattern formed thereon is shown, without any intelligence projected thereon.

From the foregoing it is clear that by this invention specimens having varying gloss factors may be easily and quickly evaluated and segregated in accordance with a numerical value. Results will be reproducible and will take into account the factors of fiber surface characteristics of the baseboard, the effectiveness of the sanding of the primer, the degree of delustering which has occurred in baking or aging, wrinkling of the finish coating, as well as other factors which affect the gloss factor of the final exposed surface.

I claim:

1. In a device for determining by visual observation the characteristics of a glossy surface, the combination of a support for holding a specimen to be observed in a substantially vertical plane, a housing spaced from said specimen support and having an opening at one end thereof, a light source within the housing directed toward said opening, a translucent mask closing said opening in said housing and interposed between said light source and said specimen support in a substantially vertical plane and substantially parallel with the surface of a specimen when received on said support, and opaque intelligence of graded size provided on said mask for reflection by a spaced specimen on said specimen support as intelligence of graded size for visual observation in gloss determination.

2. In a device for determining by visual observation the characteristics of a glossy surface, the combination of a support for a specimen to be observed, a light source, a translucent mask of linen tracing cloth spaced from said specimen support and interposed between said light source and said specimen support and disposed in a plane substantially parallel to the general plane of a specimen when received on said specimen support, and opaque intelligence in the form of block letters of sharp outline and of graded size provided on said mask for reflection by a spaced specimen on said specimen support as intelligence of graded size for visual observation in gloss determination.

References Cited in the file of this patent

UNITED STATES PATENTS

| 1,564,013 | Pank et al. | Dec. 1, 1925 |
| 1,630,281 | Tillyer | May 31, 1927 |
| 2,462,485 | Freeman | Feb. 22, 1949 |
| 2,646,716 | Bowen | July 28, 1953 |

FOREIGN PATENTS

| 600,943 | Germany | Aug. 4, 1934 |

OTHER REFERENCES

Hunter, R. S., "Methods of Determining Glass," National Bureau of Standards Research Paper RP 958, pages 19–39, January 1937.

Luck, H. R., et al., "The Photography of Surface Details of Glossy Panels," pages 67–72 in The Photographic Journal, vol. 91 B, 1951.